DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 7

T920,003

ALCOHOLIC COMPOUNDS AS MOLYBDENUM COLLECTOR FROTHERS

William L. Groves, Jr., and Tommie G. Edwards, Ponca City, Okla., and James A. Wingrave, Austin, Tex., assignors to Continental Oil Company, Ponca City, Okla.

Continuation of abandoned application Ser. No. 105,077, Jan. 8, 1971. This application Sept. 29, 1972, Ser. No. 295,091

**Int. Cl. B03d *1/02***

U.S. Cl. 209—166

No Drawing. 6 Pages Specification

In froth flotation methods for concentrating molybdenum bearing ore by subjecting an aqueous pulp of said ore to froth flotation; the improvement comprising the use of from about 0.01 to about 0.20 lb. per ton of ore of an alcoholic compound selected from the group consisting of alcohols having the general formula $$R—CHOH—R'$$

wherein R is a hydrogen or an alkyl group containing from 1 to about 7 carbon atoms, R′ is an alkyl group containing from 1 to about 8 carbon atoms and R plus R′ contain from about 4 to about 8 carbon atoms; and alkyl phenyl alcohols containing from about 7 to about 9 carbon atoms as a collector-frother. The alcoholic compounds are shown to be effective in the recovery of molybdenum ores without the use of collectors. In comparisons of alcoholic collector-frothers alone with alcoholic collector-frothers plus conventional collectors it is shown that improved recoveries are achieved with the alcoholic collector-frothers alone.